Figure 1:
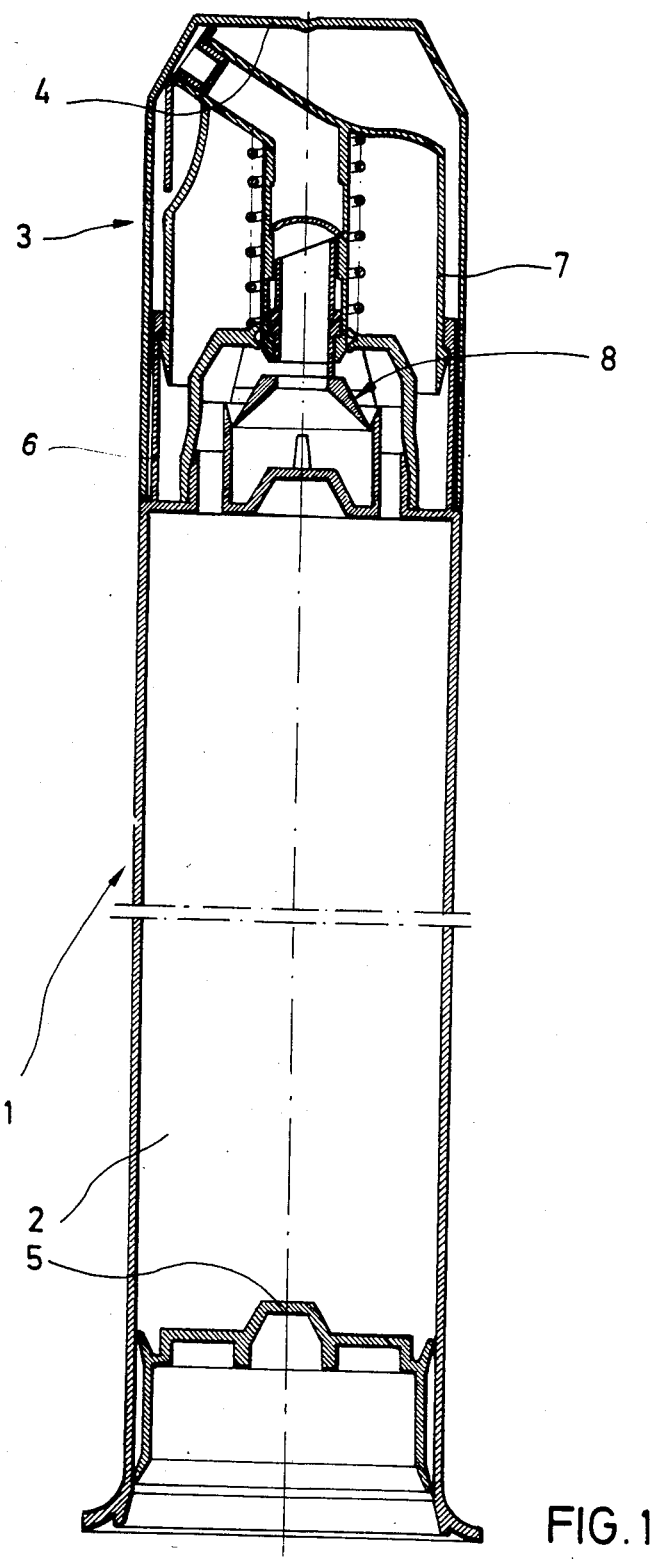

United States Patent [19]

Czech

[11] Patent Number: 4,685,594
[45] Date of Patent: Aug. 11, 1987

[54] DISPENSER FOR PASTE-LIKE PRODUCTS

[76] Inventor: Manuel Czech, Schillerstr. 12, D-8405 Donaustauf, Fed. Rep. of Germany

[21] Appl. No.: 881,693

[22] Filed: Jul. 3, 1986

[51] Int. Cl.$^4$ .......................................... G01F 11/04
[52] U.S. Cl. .................... 222/182; 222/257; 222/321; 222/383; 222/386; 222/340
[58] Field of Search ............... 222/256, 257, 259, 260, 222/321, 378, 379, 383, 386, 340; 417/545, 466, 469; 339/337

[56] References Cited

U.S. PATENT DOCUMENTS

| | | | |
|---|---|---|---|
| 1,475,980 | 12/1923 | Zerk | 222/259 |
| 1,711,777 | 5/1929 | Davis | 222/259 |
| 3,877,617 | 4/1975 | Steven | 222/321 |
| 4,323,175 | 4/1982 | Eckert | 222/256 |
| 4,515,298 | 5/1985 | Czech | 222/383 |

*Primary Examiner*—H. Grant Skaggs
*Attorney, Agent, or Firm*—James E. Nilles

[57] ABSTRACT

The invention relates to a dispenser for paste-like products which is characterized by a simplified metering device and a simple an low-cost construction in combination with reliable operation and high metering accuracy. The head piece of the dispenser includes a pump chamber at the top of a supply container communicating with the supply of the paste-like product within the container, the communication between the container and the pump chamber being established by a lateral opening in a guide member of the dispensing piston, the opening being surrounded by a bell-shaped sealing body defining a sealed communication space between the outlet opening of the container and the lateral inlet opening in the guide member of the dispenser piston. The dispenser piston is slidably mounted within the actuator cap of the dispenser which at the same time includes the dispensing channel. During the pressure-dispensing of the paste-like product from the pump chamber through the dispensing channel to the exterior, the actuator cap itself acts to obturate the lateral inlet opening, i.e. to interrupt the communication between the pump chamber and the product supply in the container, so that the full dispensing pressure acts in the pump chamber and in the dispensing channel. The release of the resiliently loaded actuator cap results in the lateral inlet opening being opened, so that paste-like product may be sucked into the pump chamber from the supply container through the communciation space and a central opening of the dispenser piston during the return stroke of the dispenser piston. The feeding of the product within the dispenser is thus directly controlled by the actuator cap in the manner of a slide valve. The dispenser may be used for dispensing paste-like products of any type.

17 Claims, 2 Drawing Figures

DISPENSER FOR PASTE-LIKE PRODUCTS

DESCRIPTION

The present invention relates to a dispenser for paste-like products, comprising a container for containing a product supply, said container having its bottom side closed by a follower piston and being provided with a head piece including a manually operable metering device comprising a dispenser piston slidably displaceable in a pump chamber by means of an actuator cap, said pump chamber being adapted to be selectively communicated with said container and with a dispensing channel, respectively, in response to displacement of said dispender piston.

Manually operable piston dispensers for creamy, flowable materials are used as portable supply containers for numerous applications, e.g. for dispensing medical or cosmetic products, for the supply of paste-like alimentary products and for metering polishes and cleaning products for instance in the domestic field.

There are numerous types of such dispenser systems in use, depending on the respective applications.

It has been found rather difficult, however, to devise a structurally simple and inexpensive handling and actuating system for dispensers of this type, which should be readily and reliably operable over extended periods of time and ensure clean and metered dispensing of the respective paste-like product.

Proposed in DE-OS No. 36 01 311 is a dispenser of the type defined above which functions on the pressure piston principle with the employ of a follower piston for ensuring the feed of the paste-like product within the dispenser.

In this case, the product is supplied from a large-volume supply container to a smaller pump chamber with the aid of atmospheric pressure acting on the follower piston, when the respective dispenser piston moves upwards in a suction stroke, as a result of which the pressure in the pump chamber is lower than that in the large-volume supply container. Depression of the dispensing piston causes a non-return valve connecting the pump chamber to the large-volume supply container to be closed, and a second non-return valve in the dispensing channel of the dispenser to be opened, so that the paste-like product is dispensed from the pump chamber in response to the length of the stroke of the dispenser piston.

This basic construction of a dispenser has been found useful for dispensing paste-like products. The proper function of a dispenser of this type depends to a substantial degree on the reliable operation of the first and second non-return valves. With a view to further reducing the production costs for dispensers of this type, it is desirable to further lower the requirements and demands regarding the construction and design of the control valves for admitting the paste-like products from the supply container to the pump chamber, and from the pump chamber to the dispensing channel.

In this context, particular attention has to be devoted to the manufacturing costs required for making the dies employed for injection-molding the components of the dispenser of a plastics material as a preferred production method.

It is therefore an object of the present invention to improve a dispenser of the type defined above in such a manner that its construction is greatly simplified, particularly as regards its control elements controlling the dispensing of the paste-like product, so as to provide a compact and reliably operable construction capable of being assembled in a simple manner and of functioning reliably and with a high metering accuracy.

In accordance with the characterizing clause of claim 1 the invention attains this object by the provision that the actuating cap of the dispenser is provided with an axial tube portion in which a guide tube of the dispenser piston is received in axially displaceable coupling engagement. Additionally provided is a sealing cap defining a communication cavity communicating on the one hand with a passage opening of the container and adapted on the other hand to be communicated with the pump chamber through a controllable supply opening, the sealing cap forming a sealed passage for the tube portion of the actuating cap, the supply opening between the pump chamber and the communication cavity being adapted to be directly controlled by the tube portion of the actuator cap.

In this manner, particularly the control of the supply of the paste-like product from the supply container to the pump chamber is considerably simplified by eliminating the necessity of the previously required differential-pressure operated valve flap for metering a determined amount of the product to be fed from the supply container to the pump chamber. This results in a considerable simplification of the dispensing mechanism as a whole, and in a reduction of the production costs of the dispenser, while providing a highly compact and reliable operating mechanism for the dispenser. According to the subject matter of the invention, the supply of the paste-like product from the supply container to the pump chamber is no longer controlled, as it was formerly, by the pressure difference between the pump chamber and the supply container, but in a rather more advantageous manner by closing the respective communication passage directly on depression of the actuator cap and the resultant displacement of the dispenser piston for the dispensing stroke. In a corresponding manner, the opening of this passage during the suction stroke of the dispenser piston is directly controlled by the displacement of the actuator cap and the dispenser piston relative to one another. Further advantageous aspects of the invention are detailed in the subclaims.

Figure 2:
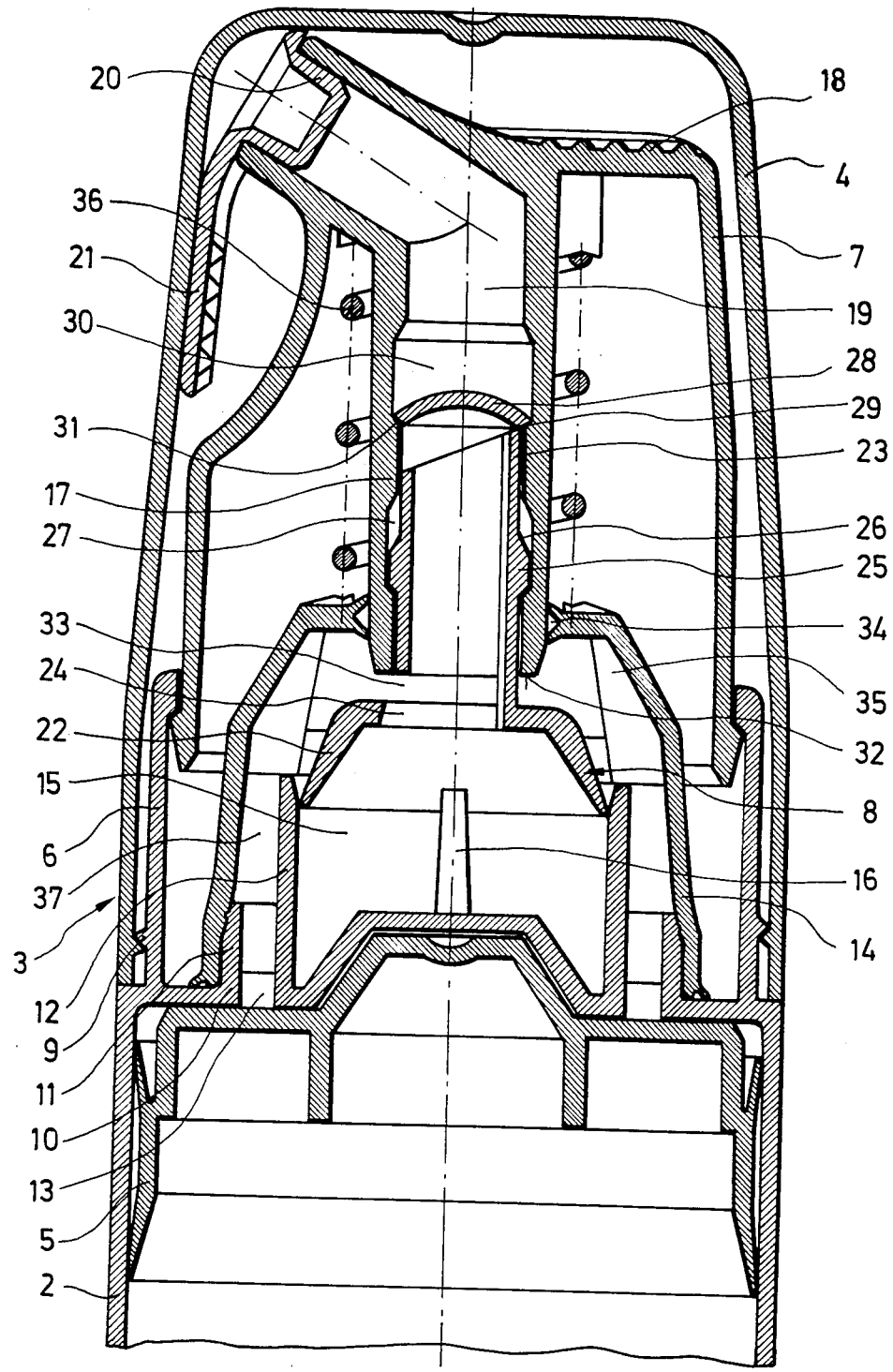

An embodiment of the invention shall now be described in detail by way of example with reference to the accompanying drawings, wherein:

FIG. 1 shows a diagrammatical view of a dispenser in a longitudinal section, and FIG. 2 shows an enlarged longitudinal sectional view of a head piece of the dispenser of FIG. 1.

Diagrammatically shown in FIG. 1 is a longitudinal sectional view of a dispenser 1 for paste-like products, for instance toothpaste. The main components of dispenser 1 include a cylindrical container 2, a head piece 3 connected to the top of container 2, a closure cap 4 covering the top of container 2 including head piece 3, and a follower piston 5 slidably supported in container 2. Head piece 3 is defined by a cylindrical outer guide section 6 supporting an actuator cap 7. All of the components of dispenser 1 are preferably made by injection-molding a suitable plastics material, particularly polyethylene or polypropylene, so that dispenser 1 is of lightweight construction while avoiding any reaction between the paste-like product contained in container 2 and the material of dispenser 1. Follower piston 5 acts to feed the paste-like product from the interior of supply container 2 to a metering device 8 forming the essential portion of head piece 3. In this manner, the product in container 2 is always subjected to the pressure of the ambient atmosphere acting on the bottom face of follower piston 5. As a result, the dispensing of the product from dispenser 1 causes follower piston 5 to be automatically moved upwards in the feed direction, so that container 2 is incrementally emptied on actuation of metering device 8 of the dispenser. This ensures a simple feeding of the paste-like product within dispenser 1 to metering device 8 in head piece 3. At the same time this arrangement is effective to avoid the occurrence of a vacuum within container 2 on dispensing the paste-like product from dispenser 1, as well as the entry of ambient air into the interior of the container.

Outer guide section 6 of head piece 3 is slightly offset radially inwards with respect to the cylindrical wall of container 2, an exterior threaded collar forming a seat for closure cap 4 to be positioned on container 2 in axial alignment therewith, so that dispenser 1 as a whole has a smooth and uniform outer shape.

The construction of head piece 3, and in particular of metering device 8 is more clearly evident from FIG. 2, showing an enlarged illustration of the head piece 3 of FIG. 1 with closure cap 4 positioned thereon.

As shown in this figure, outer guide section 6 including threaded collar 9 for threaded engagement of closure cap 4 on its outer periphery is integrally connected to an end wall 10 forming the upper boundary of container 2. Proceeding radially inwards, end wall 10 is provided with coaxial annular projections 11, 12 defining one or several passage openings 13 to the interior of container 2 therebetween. Annular projection 11 is of a smaller axial length than annular projection 12 and has its outer periphery formed as a sealing seat for a bell-shaped sealing cap 14 to be described in detail as the description proceeds. Inner annular projection 12 is formed as an annular wall of a pump chamber 15 as an important element of metering device 8. A bottom portion of pump chamber 15 is formed integrally with end wall 10 in the shape of a frustoconical elevation projecting upwards into pump chamber 15 so as to ensure the substantially complete dispensing of a product supply introduced into the pump chamber. Also for ensuring substantially complete dispensing of the paste-like product from dispenser 1, the bottom portion of pump chamber 15 is formed with a centrally located pin 16 extending axially upwards.

FIG. 2 shows follower piston 5 in its upper end position in which it abuts end wall 10, and in which the paste-like product has been completely discharged from container 2. Corresponding to the shape of the bottom portion of pump chamber 15 which at this location forms the upper closure of the interior of container 2, follower piston 5 is integrally formed with a central frustoconical projection adapted in the upper end position of follower piston 5 to conform to the concave configuration of the lower surface of the bottom portion of pump chamber 15 so as to ensure substantially complete emptying of container 2.

As already stated above, outer guide section 6 also serves as a sliding seat for the axial displacement of actuator cap 7 retained thereon by the engagement of a projection, so that actuator cap 7 cannot be removed from guide section 6 while being slidingly displaceable thereon in an axially downward direction.

Actuator cap 7 is of inverted cup-shaped configuration and integrally connected to an inner tube portion 17 coaxial with actuator cap 7 at a central location thereof. The top wall of actuator cap 7 defines the axially upper end of the assembled dispenser and is formed with slip-preventing grooves 18. Tube portion 17 is angled outwards adjacent the top wall of actuator cap 7.

With its interior diameter tube portion 17 defines an outlet channel of dispenser 1, i.e. the paste-like product is dispensed directly through actuator cap 7 on depression thereof.

For avoiding entry of ambient atmosphere into the interior of tube portion 17, the outlet opening of dispensing channel 19 may be closed by a removable closure member 20 formed with a grip element 21 for facilitating its insertion into dispensing channel 19 and its removal therefrom for use of dispenser 1.

The lower end portion of central tube portion 17 of actuator cap 7 projecting towards container 2, acts as a mounting portion for a dispenser piston 22 of metering device 8.

To this purpose, a guide tube 23 of dispenser piston 22 is slidably received in tube portion 17. Dispenser piston 22 is formed as a hollow conical member having a lower peripheral sealing edge formed by the cuneiform convergent cross-section of dispenser piston 22 and disposed in sealingly sliding engagement with the interior surface of the annular wall of pump chamber 15, i.e. with the inner wall surface of annular projection 12.

Guide tube 23 is integrally connected to dispenser piston 22, with the inner tubular cross-section of guide tube 23 extending through dispenser piston 22 itself, so that the latter has an opening 24 through which pump chamber 15 communicates with guide tube 23 from below dispenser piston 22.

For retaining dispenser piston 22 in tube portion 17 by means of its integral guide tube 23, the latter has its outer periphery formed with a circumferential annular projection 25 defined in the axial direction by suitable shoulders 26. This annular projection acts as an engagement element positively retained in a first cylindrical recess 27 in the interior wall surface of tube portion 17. Upper and lower annular shoulders defining the first cylindrical recess are inclined in a manner corresponding to the inclination of shoulders 26 of annular projection 25 on guide tube 23.

The axial length of first cylindrical recess 27 of tube portion 17 is greater than that of annular projection 25 on guide tube 23, thus permitting a sliding displacement to occur between tube portion 17 and guide tube 23.

The end of guide tube 23 facing towards the downstream end of dispensing channel 19 is formed with an inclined end face. The thus formed pointed end portion of guide tube 23 is hingedly connected to a valve flap 28 formed integral therewith.

Dispenser piston 22, guide tube 23 and valve flap 28 are preferably made as a unitary injection-molded plastics structure.

Valve flap 28 is hingedly connected to guide tube 23 by a connection strip 29 and formed in the manner of a spherical wall section. In association with valve flap 28, a second cylindrical recess 30 formed in tube portion 17 above first cylindrical recess 27 provides an inclined annular seat surface 31 for supporting a complementary sealing edge of valve flap 28 thereon.

Guide tube 23 is received in tube portion 17 in such a manner that the distance between annular projection 25 of guide tube 23 and the rear face of dispenser piston 22 is greater than the length of the respective end portion of tube portion 17 surrounding guide tube 23. Due to the provision of this distance the lower end edge 32 of tube portion 17 is disposed opposite the rear face of dispenser piston 22.

In this case, the above defined distance at the same time establishes a limit for the maximum opening width of a slot 33 formed in the wall of guide tube 23 and leading to a lateral opening of metering device 8. As will be explained as the description proceeds, slot 33 thus forms an entry opening for the paste-like product from container 2 into pump chamber 15 via opening 24 of dispenser piston 22.

The active parts of metering device 8, i.e. pump chamber 15 with dispenser piston 22 and its mounting in tube portion 17 of actuator cap 7, and including passage opening 13 in end wall 10 of container 2, are sealingly enveloped by bell-shaped sealing cap 14, to which purpose the latter is sealingly mounted on end wall 10 so as to surround annular projection 11, while its upper portion is formed with a passage 34 for tube portion 17 to extend therethrough in a sealing slide fit. To this purpose sealing cap 14 is provided with a pair of sealing lips adjacent passage 34. Further sealing lips are integrally formed adjacent end wall 10, and annular projection 11 is provided with an annular sealing collar (not shown in the drawings) sealingly engaging the interior wall surface of sealing cap 14.

For achieving a good sealing effect, sealing cap 14 should be made of a soft elastic plastics material or of a durable rubber-elastic material.

For ensuring sufficient form stability, an upper portion of sealing cap 14 above pump chamber 15 is formed with stiffener ribs 35 supported on the upper rim of annular projection 12, i.e. of the annular wall of pump chamber 15. This results in a sufficient stiffness of sealing cap 14 in the axial direction, which is important in view of the fact that the substantially horizontal top surface of sealing cap 14 has to support a return spring 36 effective to bias actuator cap 7 upwards to its rest position defined by engagement with outer guide section 6.

Bell-shaped sealing cap 14 thus defines a sealed annular communication space 37 by way of which the interior of container 2 communicates with pump chamber 15, and thus with dispensing channel 19, via the at least one passage opening 13, for instance one or more annular slot sections formed in end wall 10, slot 33 and opening 24 of dispenser piston 22.

The above described dispenser 1 operates as follows:

Be it assumed that follower piston 5 is in its lowermost position, that container 2 is filled with a paste-like product to be dispensed, and that communication space 37 including pump chamber 15 are likewise filled with the paste-like product.

As actuator cap 7 is now depressed against the biasing force of return spring 36 to be displaced axially downwards on outer guide section 6, tube portion 17 of actuator cap 7 is moved downwards by a distance corresponding to the axial length of first cylindrical recess 27, while dispenser piston 22 including guide tube 23 is kept stationary by the action of frictional forces and by the resistance offered by the mass of the paste-like product contained in pump chamber 15. Simultaneousyl with the downward movement of tube portion 17, annular seat surface 31 moves away from the associated sealing edge of valve flap 28, which is then only retained on guide tube 23 by its connection strip. The displacement of tube portion 17 relative to guide tube 23 at the same time results in the obturation of slot 33 in the manner of a slide valve control, whereupon end rim 32 comes into contact with the rear face of dispenser piston 22 to act as an actuator element for dispenser piston 22. The stroke of this displacement corresponds to the difference between the axial lengths of annular projection 25 and first cylindrical recess 27, so that substantially at the same time the upper end of first cylindrical recess 27 comes into contact with upper shoulder 26 of annular projection 25. Further depression of actuator cap 7 subsequently results in synchronous downward displacement of dispenser piston 15 to thereby reduce the volume of pump chamber 15.

It need not be mentioned, of course, that closure member 20 has been removed from the outlet opening of dispensing channel 19 prior to actuation of dispenser 1.

Due to the obturation of slot 33, and assisted by the conical interior contours of dispenser piston 22 corresponding to the configuration of the bottom portion of pump chamber 15 including central pin 16, the paste-like product contained in pump chamber 15 is now displaced inwards from the peripheral zones of pump chamber 15 and upwards through opening 24 of dispenser piston 22 into guide tube 23, whereby valve flap 28 is swivelled to an open position, permitting a metered amount of the paste-like product to enter dispensing channel 19 and to be dispensed therefrom. The complementary configuration of the hollow-cone dispenser piston and of the bottom wall portion of pump chamber 15 including central pin 16 is conducive to a complete emptying of pump chamber 15 during a full pressure stroke, and to the establishment within pump chamber 15 of a determined direction of flow, whereby portions of the paste-like product contained in the lower peripheral zones of the pump chamber are reliably expelled at the end of the dispensing stroke. The central pin 16 is also effective to avoid an accumulation of the paste-like product in the central area of the bottom of the pump chamber, and to assist the entry of the paste-like product into guide tube 23, i.e., into the end of dispensing channel 19.

As the downwards displacement of actuator cap 7 is terminated by relieving the exterior actuating force acting thereon, return spring 36 acts to return actuator cap 7 upwards to its initial position, while dispenser piston 22 is initially kept stationary by the friction acting between the sealing edge of dispenser piston 22 and the interior wall surface of pump chamber 15, i.e. annular projection 12, so that at the beginning of the return movement of actuator cap 7, tube portion 17 moves upwards relative to guide tube 23 and dispenser piston 22 by a distance corresponding to the difference in axial length between annular projection 25 and first cylindrical recess 27, until the lower shoulder of the annular projection comes into contact with the lower shoulder of first cylindrical recess 27, whereupon the dispenser piston follows the upwards movement of actuator cap 7. In this manner the obturation of slot 33 by tube portion 17 is cancelled before dispenser piston 22 starts moving upwards. At the same time, annular seat surface 31 of second cylindrical recess 30 in tube portion 17 comes into contact with valve flap 28, whereby the latter is returned to its closed position in sealing engagement of its peripheral rim with annular seat surface 31 of second cylindrical recess 30. This actuation of the valve flap is assisted by the paste-like product remaining within dispensing channel 19 above valve flap 28 at the end of the dispensing operation, as the vacuum created within pump chamber 15 by the return stroke of the actuator cap tends to suck the remaining product back into the pump chamber.

The vacuum created in pump chamber 15 by the return movement of dispenser piston 22 as a result of the return movement of actuator cap 7 by the action of return spring 36 in combination with the described simultaneous opening of slot 33 results in that, assisted by the atmospheric pressure acting on follower piston 5, a further charge of the paste-like product is sucked into pump chamber 15 via opening 13, communication space 37, slot 33 and opening 24 of dispenser piston 22, so that pump chamber 15 is again filled with the paste-like product preparatory to the next dispensing stroke.

The control of slot 33 is thus established in a particularly favourable manner by the sliding fit of guide tube 23 in tube portion 17 to function on the principle of a slide valve control, to thereby achieve a greatly simplified construction and reliable operation of the dispenser itself and its valve control means.

The described dispenser is characterized by the lateral entry of the paste-like product from container 2 into pump chamber 15, from which metered amounts of the paste-like product are dispensed through the dispenser piston 22 and centrally through the actuator cap.

All of the components of dispenser 1, with the exception of return spring 36 are made as injection-molded plastic parts.

The described embodiment of the dispenser may of course be modified in various manners without sacrificing the simple basic construction thereof, particularly as regards its valve control. It is thus possible to employ separate sealing rings adjacent passage 34, or to insert a separate non-return valve in place of valve flap 28. It is also envisaged, for instance, to mount pump chamber 15 on end wall 10 in the form of a separate sleeve member.

The dispenser is characterized by an uncomplicated construction, and in particular, by a simplification of the metering device with regard to the required valve control between the supply container and the pump chamber, and between the pump chamber and the dispensing outlet, and offers a high degree of reliability in the accurately metered dispensing of paste-like products of any type, such as pharmaceutical creams and ointments, paste-like alimentary products, e.g. mustard, ketchup and the like, or cleansing and other treatment compositions for cosmetic uses as well as for use in the domestic and automotive maintenance fields.

I claim:

1. A dispenser for paste-like products, comprising a container for containing a product supply, said container being open at a bottom end thereof, a follower piston closing the bottom of said container, means at the upper end of said container defining a pump chamber, a dispenser piston slidable in said pump chamber in one direction for drawing product into the pump chamber from the container and in the opposite direction for forcing product out of the pump chamber, and a manually operable actuator cap for moving said dispenser piston, said dispenser being characterized by:
   (1) said actuator cap having an actuator tube portion fixed thereon that extends in said directions and is movable between defined limits in said directions;
   (2) said dispenser piston having a guide tube portion fixed thereon which is in coaxial slidingly guided sealing relationship with said actuator tube portion and the interior of which is communicated with the pump chamber through the dispenser piston to cooperate with the actuator tube portion in providing an outlet passage for flow of product out of the pump chamber;
   (3) said tube portions having cooperating abutments defining a lost motion connection between them that permits said actuator tube portion to move relative to said guide tube portion during an initial stage of movement of the actuator tube portion from each of said limits to the other but otherwise constrains said guide tube portion to move in unison with the actuator tube portion;
   (4) a sealing cap fixed on the container at said upper end thereof and through which at least one of said tube portions extends with a slidable sealing fit, said sealing cap defining an inlet passage which is communicated with the interior of the container and in which product flows from the container towards said pump chamber; and
   (5) at least one of said tube portions having a hole therethrough
      (a) through which said pump chamber is communicated with said inlet passage when said tube portions are moving in unison in said one direction and
      (b) which is sealingly closed by a portion of the other of said tube portions when the tube portions are moving in unison in said opposite direction.

2. The dispenser of claim 1, further characterized by:
   (6) a spring reacting between an upper end portion of said container and said actuator cap and biasing the latter in said one direction.

3. The dispenser of claim 2 wherein said one direction is upward relative to said container and wherein said spring reacts downward against the upper end portion of said container through said sealing cap, said sealing cap being characterized by:
   (a) an annular lower portion which sealingly engages a top wall of the container around an opening therein through which the interior of the container is communicated with said inlet passage defined by the sealing cap, and
   (b) an annular upper portion which comprises
      (1) a sealing lip which sealingly surrounds said at least one tube portion and
      (2) an annular surface which surrounds said sealing lip and which provides a seat for a lower end of said spring.

4. The dispenser of claim 3 wherein said pump chamber is defined by a radially inner annular wall that projects upward from said top wall of the container and wherein said sealing cap has an annular end wall at its top which defines said sealing lip and said annular surface, and said annular lower portion of the sealing cap is on a side wall thereof that projects downward from its said end wall, further characterized by:
   a plurality of circumferentially spaced ribs on said sealing cap, at the interior thereof, connected between its said side wall and its said end wall and having edge portions which rest upon the top edge of said radially inner annular wall to support said end wall of the sealing cap against the reaction of said spring.

5. The dispenser of claim 1, further characterized by:
   (6) a one-way valve element in said outlet passage cooperable with a seat surface on one of said tube portions to prevent flow of product in the outlet passage towards the pump charber but movable off of said seat surface by pressure which urges product away from the pump chamber to permit flow of product in response to that pressure.

6. The dispenser of claim 5 wherein said guide tube portion is slidable inside said actuator tube portion and wherein said one-way valve element comprises a valve flap hingedly connected to said guide tube portion at its end remote from the dispenser piston.

7. The dispenser of claim 6 wherein said guide tube portion is coaxially slidable in a lower portion of said actuator tube portion, and wherein said seat surface comprises an upwardly facing circumferential shoulder in the actuator tube portion defined by an enlarged inside diameter thereof in a zone above said guide tube portion.

8. The dispenser of claim 1 wherein said pump chamber has an upwardly projecting annular wall and the dispenser piston moves downwardly therein in said opposite direction, further characterized by:
  (a) said dispenser piston comprising an annular, frustoconical and downwardly divergent wall surrounding a central aperture which opens to the interior of said guide tube portion; and
  (b) said pump chamber having an upwardly convergent and upwardly projecting bottom wall which is frustoconical and complementary to the interior surface of said wall of the dispenser piston.

9. The dispenser of claim 8, further characterized by: a pin projecting coaxially upwardly from said bottom wall of the pump chamber to be received in said central aperture in the dispenser piston to provide for substantially complete emptying of the pump chamber when the dispenser piston is at the lower limit of its movement.

10. The dispenser of claim 1 wherein said pump chamber is defined by a radially inner annular wall that projects upwardly from a top wall of the container, and wherein said actuator cap is of inverted cup shape, having a side wall which surrounds said actuator tube portion thereof and which has a lower rim portion, further characterized by:
  said container having a radially outer annular wall projecting upwardly from its top wall and with which said rim portion has coaxial slidably guided engagement to be confined to up and down motion relative to the container.

11. The dispenser of claim 10, further characterized by:
  said container having a radially intermediate annular wall projecting upwardly from its said top wall in radially spaced relation to said radially inner and radially outer annular walls and which is sealingly engaged with said sealing cap and provides for securement of the same to said container, said top wall of the container having an aperture between said radially inner and radially intermediate annular walls to provide for communicating the interior of the container with said inlet passage defined by the sealing cap.

12. The dispenser of claim 10 wherein said radially outer annular wall is coaxial with the container and wherein said rim portion of the acutator cap side wall is slidably engaged with the radially inner surface of said radially outer annular wall, further characterized by:
  (a) an inverted cup-shaped closure cap for covering said acutator cap, said closure cap having a downwardly projecting side wall with a lower rim portion; and
  (b) cooperating means on said rim portion of the closure cap side wall and on the radially outer surface of said radially outer annular wall for detachably securing the closure cap to the container.

13. The dispenser of claim 12 wherein said container has a cylindrical exterior surface and wherein said rim portion of the closure cap side wall has the same outside diameter as the container so that the closure cap appears to form a smooth continuous unit with the container when it is secured to the container.

14. The dispenser of claim 10 wherein said radially inner and radially outer annular walls are coaxial with the container, further characterized by:
  (a) said container having a radially intermediate annular wall projecting upwardly from its said top wall in coaxial radially spaced relation to said radially inner and radially outer annular walls and which is sealingly engaged with said sealing cap and provides for securement of the same to said container, and
  (b) said top wall of the container having a plurality of apertures therein that are between said radially inner and radially intermediate annular walls and provide for communicating the interior of the container with said inlet passage defined by the sealing cap.

15. The dispenser of claim 1 wherein said one direction upward relative to the container and said guide tube portion projects upward from the dispenser and is slidable inside said actuator tube portion, further characterized in that
  (a) said hole for communicating the pump chamber with the inlet passage is a circumferentially elongated slot in said guide tube portion, near the dispenser piston, and
  (b) said portion of the other of said tube portions, whereby said hole is sealed when the tube portions are moving in unison in the downward direction, comprises a lower edge portion of the actuator tube portion.

16. The dispenser of claim 1 wherein said one direction is upward relative to the container and said tube portions that are in slidingly guided sealing relationship extend upwardly and downwardly in coaxial relation to the container, and wherein said outlet passage is further defined by a further actuator tube portion on said outlet cap that extends obliquely upwardly and sidewardly from said guide tube portion to a product discharge outlet, to provide for discharge of product towards one side of the container.

17. The dispenser of claim 15, further characterized by:
  a plug-like closure member sealingly receivable in said discharge outlet and having thereon a tab-like grip element that facilitates its insertion into the discharge outlet and its removal therefrom.

* * * * *